United States Patent
Zhong

(10) Patent No.: US 9,124,684 B2
(45) Date of Patent: Sep. 1, 2015

(54) SIGNAL TESTING SYSTEM OF A HANDHELD DEVICE AND A SIGNAL TESTING METHOD THEREOF

(71) Applicants: Inventec Appliances (Pudong) Corporation, Shanghai (CN); Inventec Appliances Corp., New Taipei (TW); Inventec Appliances (Jiangning) Corporation, Nanjing (CN)

(72) Inventor: Ren-Hui Zhong, Nanjing (CN)

(73) Assignees: INVENTEC APPLIANCES (PUDONG) CORPORATION, Shanghai (CN); INVENTEC APPLIANCES CORP., New Taipei (CN); INVENTEC APPLIANCES (JIANGNING) CORPORATION, Nanjing (CN)

( * ) Notice: Subject to any disclaimer, the term of this patent is extended or adjusted under 35 U.S.C. 154(b) by 169 days.

(21) Appl. No.: 13/950,784

(22) Filed: Jul. 25, 2013

(65) Prior Publication Data

US 2014/0080423 A1 Mar. 20, 2014

(30) Foreign Application Priority Data

Sep. 19, 2012 (CN) .......................... 2012 1 0349789

(51) Int. Cl.
*H04B 17/00* (2015.01)
*H04M 1/24* (2006.01)

(52) U.S. Cl.
CPC ...................................... *H04M 1/24* (2013.01)

(58) Field of Classification Search
CPC .... H04B 17/29; H04B 17/0085; H04W 24/06
USPC .................................. 455/67.11, 67.12, 67.14
See application file for complete search history.

(56) References Cited

U.S. PATENT DOCUMENTS

| | | | | |
|---|---|---|---|---|
| 2002/0160717 A1* | 10/2002 | Persson et al. | ............... | 455/67.1 |
| 2003/0008620 A1* | 1/2003 | Rowell et al. | ................. | 455/67.1 |
| 2006/0017630 A1* | 1/2006 | Kildal | ............................ | 343/703 |
| 2007/0050173 A1* | 3/2007 | Chen et al. | .................... | 702/182 |
| 2007/0243826 A1* | 10/2007 | Liu | ............................. | 455/67.11 |
| 2009/0282455 A1* | 11/2009 | Bell et al. | ....................... | 725/151 |
| 2009/0298440 A1* | 12/2009 | Takeya et al. | ............... | 455/67.14 |
| 2011/0230143 A1* | 9/2011 | Lundstrom et al. | ........ | 455/67.11 |

\* cited by examiner

*Primary Examiner* — Ayodeji Ayotunde
(74) *Attorney, Agent, or Firm* — Locke Lord LLP; Tim Tingkang Xia, Esq.

(57) ABSTRACT

A signal testing system of a handheld device is described in the present invention. The signal testing system comprises a testing apparatus and a computer device. The testing apparatus is connected with the handheld device. The computer device is connected with the handheld device and the testing apparatus, and is configured to control the handheld device accessing a signal testing state and receives a power value corresponding to the signal testing state through the testing apparatus.

12 Claims, 4 Drawing Sheets

SIGNAL TESTING SYSTEM OF A HANDHELD DEVICE AND A SIGNAL TESTING METHOD THEREOF

CROSS-REFERENCE TO RELATED APPLICATIONS

This non-provisional application claims priority under 35 U.S.C. §119(a) on Patent Application No. 201210349789.2 filed in P.R. China on Sep. 19, 2012, the entire contents of which are hereby incorporated by reference.

FIELD OF THE INVENTION

The present invention relates to a signal testing system and a signal testing method thereof, and more particularly relates to a signal testing system of a handheld device and a signal testing method thereof.

BACKGROUND OF THE INVENTION

Attending with the progress of technology, the smart phone have become a major product of the telecommunication industry. It is demanded to have the smart phone supporting the various code division multiple access (CDMA) standards globally. To fulfill the need, the smart phone usually covers all the CDMA frequency bands and the corresponded second path to enhance signal receiving ability.

Generally, the CDMA frequency bands include the 820~900 MHz cellular band, the 1850~1990 MHz PCB band, the 1710~1755 MHz AWS-U band, and the 2110~2155 MHz AWS-D band. In considering the frequency bands and the corresponded second path, various signal testing items need to be completed when manufacturing the cell phones.

The testing method in present needs the tester to operate the testing equipment manually to complete the signal emitting/receiving test of cell phone under signaling mode. Because the testing is manually operated, there exist the problems of time consuming and bad testing efficiency.

BRIEF SUMMARY OF INVENTION

Accordingly, a signal testing system of a handheld device and a signal testing thereof is provided in the present invention.

In views of the above mentioned object, the signal testing system of a handheld device provided in the present invention comprises a testing apparatus and a computer device. The testing apparatus is connected with the handheld device. The computer device is connected with the handheld device and the testing apparatus, and is configured to control the handheld device accessing a signal testing state and receives a power value corresponding to the signal testing state through the testing apparatus.

In accordance with an embodiment of the signal testing system of the handheld device in the present invention, the signal testing system of a handheld device further comprises an electric shielding box and a plate antenna. The electric shielding box is configured for allocating the handheld device and the plate antenna.

In accordance with an embodiment of the signal testing system of the handheld device in the present invention, the power value is an emitting power value of the handheld device.

In accordance with an embodiment of the signal testing system of the handheld device in the present invention, the power value is a receiving power value of the handheld device.

In accordance with an embodiment of the signal testing system of the handheld device in the present invention, the computer device comprises an USB interface and a communication interface. The computer device is communicated with the handheld device by using the USB interface and is communicated with the testing apparatus by using the communication interface. In addition, the computer device further comprises a testing software.

In accordance with an embodiment of the signal testing system of the handheld device in the present invention, the computer device comprises an USB interface and a communication interface. The computer device is communicated with the handheld device by using the USB interface and is communicated with the testing apparatus by using the communication interface. In addition, the computer device further comprises a storage unit.

In accordance with an embodiment of the signal testing system of the handheld device in the present invention, the signal testing system further comprises a power supply for providing power to the testing apparatus or the handheld device.

In accordance with an embodiment of the signal testing system of the handheld device in the present invention, the handheld device is electrically connected to a battery.

In accordance with an embodiment of the signal testing system of the handheld device in the present invention, the handheld device is a mobile phone, and the mobile phone may be a smart phone.

A signal testing method of a handheld device is also provided in the present invention. The signal testing method is applicable to a signal testing system comprising a testing apparatus, which is connected with the handheld device, and a computer device, which is connected with the handheld device and the testing apparatus. The signal testing method comprises the steps of: controlling the handheld device accessing a signal testing state by using the computer device; and receiving a power value corresponding to the signal testing state through the testing apparatus by using the computer device.

In accordance with an embodiment of the signal testing method of the handheld device in the present invention, the computer device further comprises a testing software.

In accordance with an embodiment of the signal testing method of the handheld device in the present invention, the signal testing system further comprises an electric shielding box and a plate antenna, the electric shielding box is configured for allocating the handheld device and the plate antenna, the signal testing state is a signal emitting state, and the signal testing method further comprises the steps of coupling and transmitting a signal emitted by the handheld device to the testing apparatus by using the plate antenna, wherein the power value is an emitting power value corresponding to the signal. In addition, the step of controlling the handheld device accessing the signal testing state by using the computer device further comprises controlling a pulse density modulation (PDM) value of the handheld device by using the computer device.

In accordance with an embodiment of the signal testing method of the handheld device in the present invention, the signal testing state is a signal receiving state and the power value is a receiving power value. In addition, the step of controlling the handheld device accessing the signal receiving state comprises controlling a digital variable gain amplifier (DVGA) value of the handheld device by using the computer device.

In accordance with an embodiment of the signal testing method of the handheld device in the present invention, before the step of controlling the handheld device entering the signal testing state by using the computer device, the signal testing method further comprises the steps of: transmitting a sequence program through the testing software to read a serial number of the handheld device by using the computer; and deciding whether to control the handheld device entering the signal testing state or not according to the serial number by using the computer device.

In accordance with an embodiment of the signal testing method of the handheld device in the present invention, the computer device further comprises an allocating document, which includes a testing message, and the signal testing method further comprises the step of deciding a testing item of the handheld device according to the testing message by using the computer device.

In accordance with an embodiment of the signal testing method of the handheld device in the present invention, the handheld device is a mobile phone, and the mobile phone may be a smart phone.

According to the above mentioned embodiments, with the help of the communication between the computer device, the handheld device, and the testing apparatus, the testing process of the handheld device can be operated more automatically to enhance testing efficiency.

DETAILED DESCRIPTION OF THE INVENTION

The embodiments adopted in the present invention would be further discussed by using the flowing paragraph and the figures for a better understanding.

Figure 1:
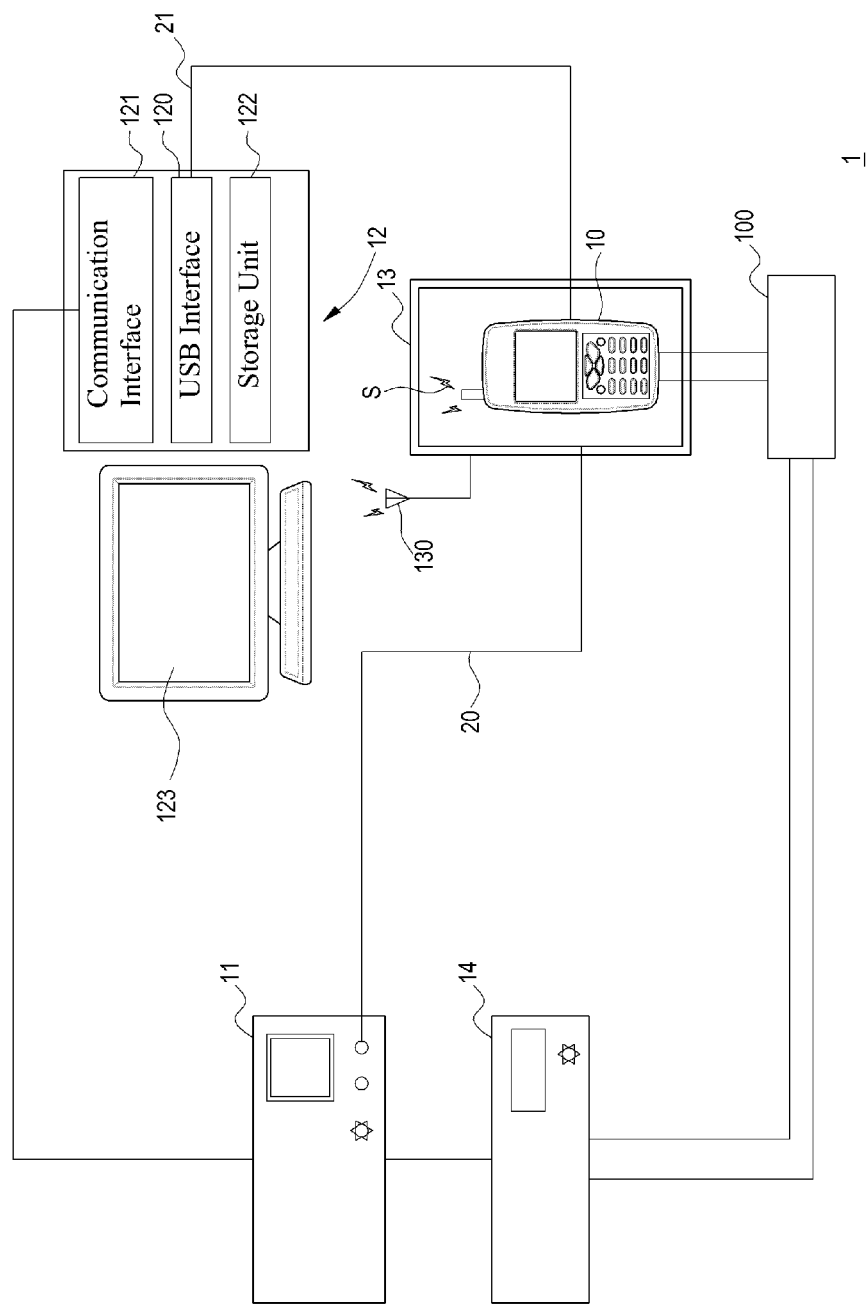
FIG. 1 is a schematic view of a signal testing system of a handheld device in accordance with an embodiment of the present invention.

FIG. 1 is a schematic view of a signal testing system of a handheld device in accordance with an embodiment of the present invention.

As shown in FIG. 1, the signal testing system 1 of a handheld device includes the handheld device 10, a testing apparatus 11, and the computer device 12.

In the present embodiment, the handheld device 11 is a mobile phone, which is understood to include the smart phones or other electronic devices with communication ability. As a preferred embodiment, the handheld device 10 supports all the frequency bands of CDMA standards and the corresponding second paths. In detail, the handheld device 10 supports both the master path and the second path. The master path is the major path for the radio frequency (RF) signals, and the second path is the assistant path for the RF signals. The relationship between master path and the second path is that the handheld device 10 can be used to receive or do the phone call even without the second path. The function of the second path is to enhance emitting/receiving ability of the master path.

In short, both the master path and the second path can be regarded as the signal emitting/receiving channel of the handheld device 10, and the signal test described in the embodiments of the present invention includes the signal emitting test or the signal receiving test of the handheld device 10.

In addition, the signal testing system 1 of the handheld device further comprises an electric shielding box 13 and a plate antenna 130. The electric shielding box 13 is configured for allocating the handheld device 10 and the plate antenna 130 so as to prevent the problem of environmental noise or interference when doing signal test to guarantee testing quality.

The testing apparatus 11 is connected with the handheld device 10. In the present embodiment, the testing apparatus 11 is capable to communicate with the handheld device 10 by using a connecting wire 20, such as a RF cable. However, the present invention is not so restricted.

The computer device 12 is connected with the handheld device 10 and the testing apparatus 11. For example, the computer device 12 includes an USB interface 120 and a communication interface 121. The computer device 12 is communicated with the handheld device 10 by using the USB interface 120. In detail, an USB connecting wire 21 can be used to connect the USB interface 120 by using one end thereof and connect the handheld device 10 by using the other end thereof so as to have the computer device 12 communicated with the handheld device 10. In addition, the computer device 12 is communicated with the testing apparatus 11 by using the communication interface 121, such as the communication interface 121 supporting general-purpose interface bus (GPIB).

It should be noted that the communication method between the computer device 12 and the handheld device 10 as well as the testing apparatus 11 is merely an example for better understanding the present invention, and should not be regarded as a limitation of the present invention.

Moreover, the computer device 12 also includes a storage unit 122, the testing software, and a screen 123 for showing the corresponding testing message. The storage unit 122 can be a hard disc, a memory card, or other storage devices. The testing software and the various related testing information when the handheld device 10 is doing signal test, such as status control, testing progress, testing record, or testing result correspond, can be stored in the storage unit 122.

In addition, the signal testing system 1 of the handheld device also includes a power supply 14, such as a DC power supplier. The handheld device 10 is also electrically connected to a battery 100. The power supply 14 is configured to supply power to the testing apparatus 11 or the handheld device 10. In the present embodiment, the power supply 14 supplies electric power to the testing apparatus 11 and the battery 100 connected to the handheld device 10. However, the present invention is not so restricted.

As the handheld device 10, the testing apparatus 11, and the computer device 12 are successfully communicated with each other, the computer device 12 can be used to control the handheld device 10 and the testing apparatus 11 respectively by using the testing software. In detail, the computer device 12 is capable to be used to control the handheld device 10 to access a signal testing state. The signal testing state may be the signal emitting state or the signal receiving state of the handheld device 10. Then, the computer device 12 can be used to receive the power value corresponding to the signal testing state through the testing apparatus 11.

For example, when the computer device 12 controls the handheld device 10 accessing the signal emitting state, the computer device 12 is capable to receive the emitting power value corresponding to the signal emitting state, i.e. the emitting power value of the handheld device 10, through the testing apparatus 11, and when the computer device 12 controls the handheld derive 10 accessing the signal receiving state, the computer device 12 is capable to receive the receiving power value corresponding to the signal receiving state, i.e. the receiving power value of the handheld device 10, through the testing apparatus 11.

Figure 2:
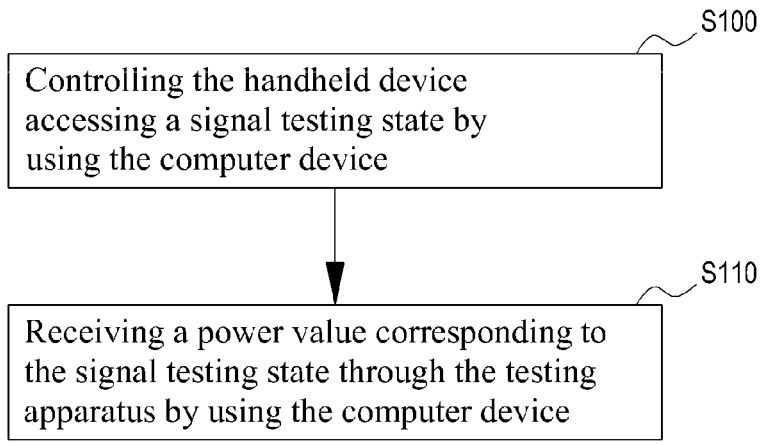
FIG. 2 is a flowchart showing the signal testing method of a handheld device in accordance with an embodiment of the present invention.

Please refer to both FIG. 1 and FIG. 2, wherein FIG. 2 is a flowchart showing the signal testing method of a handheld device in accordance with an embodiment of the present invention.

The signal testing method of the handheld device is applicable to the signal testing system 1 mentioned above. As mentioned, the signal testing system 1 includes the handheld device 10, the testing apparatus 11, and the computer device 12 communicated with each other. The detail of the signal testing system 1 can be referred to the above paragraphs and is not repeated here.

The signal testing method of the handheld device includes: controlling the handheld device accessing a signal testing state by using the computer device (step S100); and receiving a power value corresponding to the signal testing state through the testing apparatus by using the computer device (step S110).

When doing signal test of the handheld device, the tester may have the handheld device 10, the testing apparatus 11, and the computer device 12 communicated with each other by using the connecting wires, such as the connecting wire 20 and the USB connecting wire 21, and the communication interface, such as the communication interface 121. Then, the corresponded testing parameters of the handheld device 10 and the testing apparatus 11 can be set individually by using the testing software of the computer device 12.

After the handheld device 10 powered by the battery 100 is turned on, the computer device 12 can be used to control the handheld device 10 accessing the signal testing state (step S100). Then, the testing software of the computer device 12 can be used to read out the power value corresponding to the signal testing state through the communication interface 121. That is, the computer device 12 is capable to receive the power value corresponding to the signal testing state through the testing apparatus 11.

Concretely speaking, the computer device 12 is capable to control the handheld device 10 accessing the signal testing state. The signal testing state may be the signal emitting state of the handheld device 10 or the signal receiving state of the handheld device 10. Then, the computer device 12 is capable to receive the power value corresponding to the signal testing state through the testing apparatus 11.

When the computer device 12 controls the handheld device 10 accessing the signal emitting state, the computer device 12 is capable to receive the emitting power value corresponding to the signal emitting state, i.e. the emitting power value of the handheld device 10, through the testing apparatus 11, and when the computer device 12 controls the handheld derive 10 accessing the signal receiving state, the computer device 12 is capable to receive the receiving power value corresponding to the signal receiving state, i.e. the receiving power value of the handheld device 10, through the testing apparatus 11.

In addition, before the step S100, which controls the handheld device 10 accessing the signal testing state by using the computer device 12, the computer device 12 may transmit a sequence program through the testing software to read a serial number (SN) of the handheld device 10. Then, the computer device 12 is capable to decide whether to control the handheld device 10 entering the signal testing state or not according to the serial number. Thereby, the signal testing method is capable to determine if the handheld device 10 is under test or has been tested so as to prevent the problem of repeating test.

Figure 3:
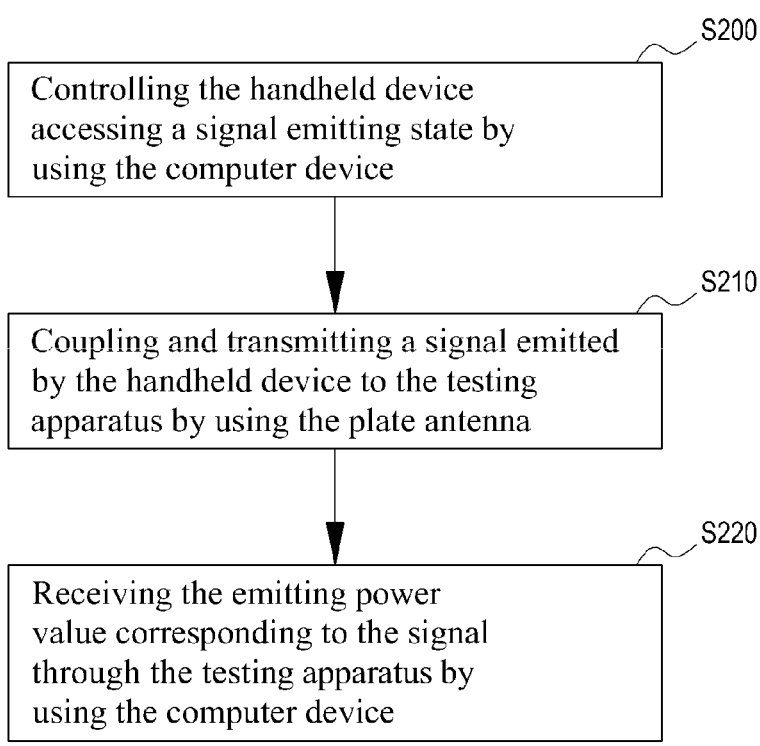
FIG. 3 is a flowchart showing the signal testing method of a handheld device in accordance with another embodiment of the present invention.

Please refer to both FIG. 1 and FIG. 3, wherein FIG. 3 is a flowchart showing the signal testing method of a handheld device in accordance with another embodiment of the present invention.

The signal testing method of the handheld device includes: controlling the handheld device accessing a signal emitting state by using the computer device (step S200); coupling and transmitting a signal emitted by the handheld device to the testing apparatus by using the plate antenna (step S210); receiving the emitting power value corresponding to the signal through the testing apparatus by using the computer device (step S220). Steps S200 to S220 can be regarded as testing the master path of the handheld device 10.

As mentioned, after the handheld device 100 powered by the battery 100 is turned on, the computer device 12 is capable to control the handheld device 10 accessing signal emitting state (step S200). In the step S200, the testing software of the computer device 12 transfer a high-pass function to test the master path of the handheld device 10 through the USB connecting wire 21. In addition, the computer device 12 can be used to control (setup) a pulse density modulation (PDM) value of the handheld device 10 to have the handheld device 10 entering the signal emitting state. That is, after entering the signal emitting state, the handheld device 10 emits the signal S according to the PDM value to have the signal S carrying the emitting power corresponding to the PDM value.

Then, the signal SS emitted by the handheld device 10 is coupled and transmitted to the testing apparatus 11 by using the plate antenna 130 (step S210).

Thereafter, an instruction is transmitted by using the testing software of the computer device 12 to have the testing apparatus 11 read and receive the emitting power value corresponding to the signal S (step S220). The emitting power value can be recorded and stored in the storage unit 122 for the testing software of the computer device 12 to determine if such emitting power value satisfies the testing standard.

Figure 4:
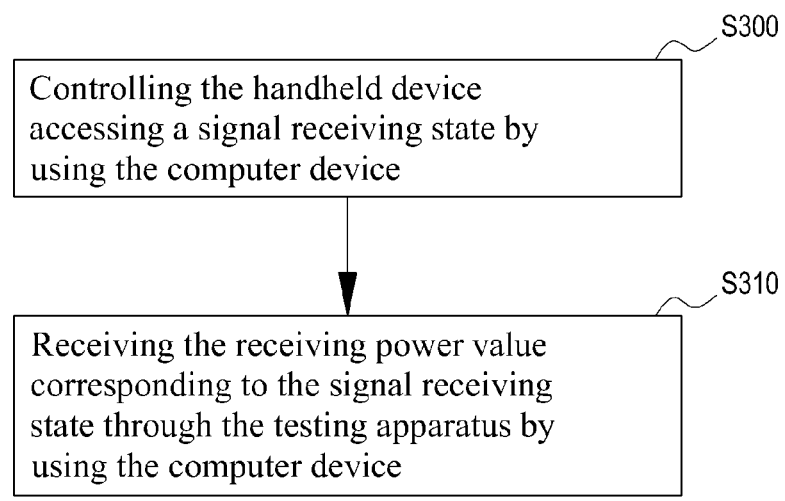
FIG. 4 is a flowchart showing the signal testing method of a handheld device in accordance with the other embodiment of the present invention.

Please refer to both FIG. 1 and FIG. 4, wherein FIG. 4 is a flowchart showing the signal testing method of a handheld device in accordance with the other embodiment of the present invention.

The signal testing method of the handheld device includes: controlling the handheld device accessing a signal receiving state by using the computer device (step S300); receiving the receiving power value corresponding to the signal receiving state through the testing apparatus by using the computer device (step S310). Steps S300 to S310 can be regarded as testing the second path of the handheld device 10.

As mentioned, after the handheld device 10 powered by the battery 100 is turned on, the computer device 12 is capable to control the handheld device 10 accessing signal receiving state (step S300). In the step S300, the testing software of the computer device 12 transfer a high-pass function to test the second path of the handheld device 10 through the USB connecting wire 21. In addition, the computer device 12 can be used to control (setup) a digital variable gain amplifier (DVGA) value of the handheld device 10 to have the handheld device 10 entering the signal receiving state. The adjustment of the DVGA value can be regarded as the adjustment of the received signal strength indication (RSSI), which is capable to have the handheld device 10 identify the power received from the environment.

After the handheld device 10 accessing the signal receiving state, the handheld device 10 receives a testing signal according to the DVGA value, such as the testing signal from the testing apparatus 11. However, the present invention is not so restricted.

Afterward, an instruction is transmitted by using the testing software of the computer device 12 to have the testing apparatus 11 read and receive the receiving power value corresponding to the signal receiving state (step S310). The receiving power value can be recorded and stored in the storage unit 122 for the testing software of the computer device 12 to determine if such receiving power value satisfies the testing standard.

Figure 5:
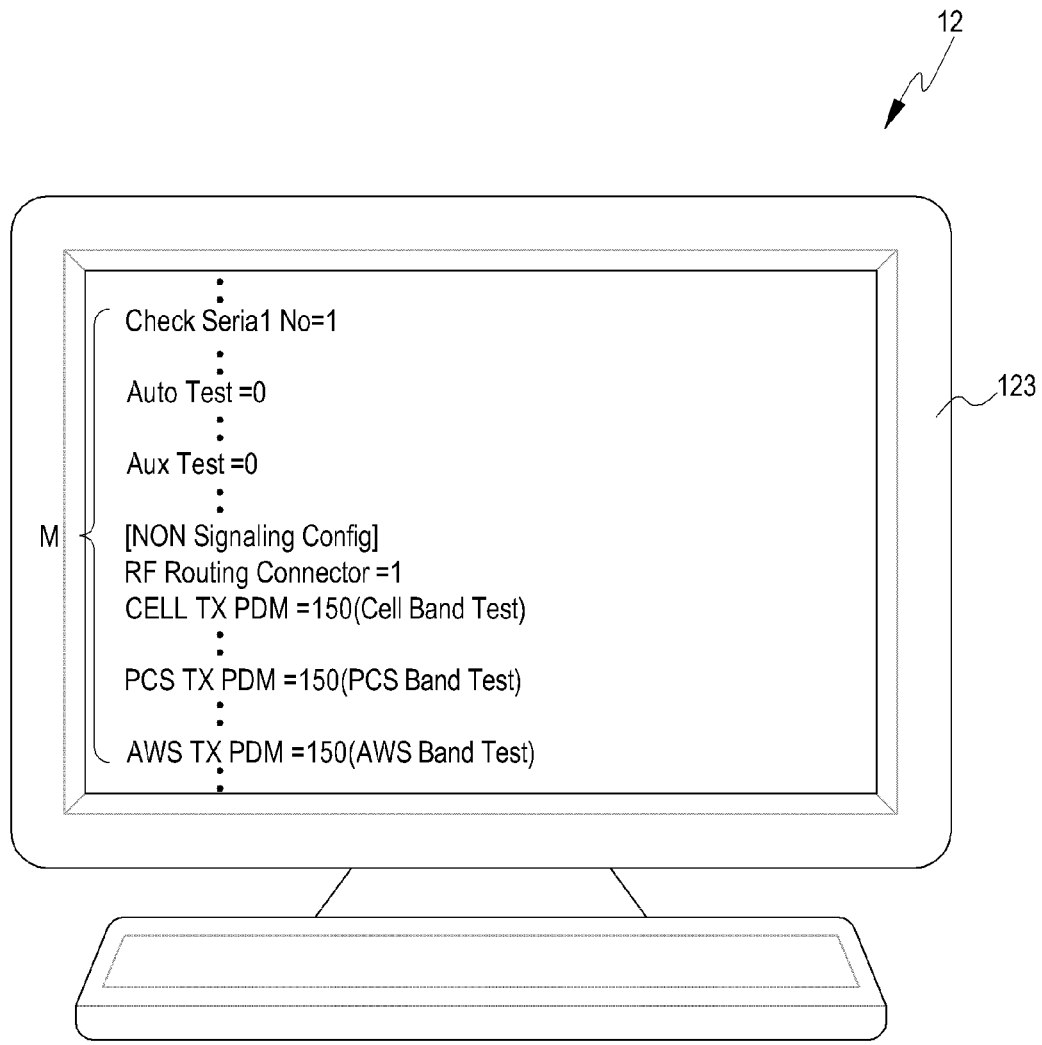
FIG. 5 is a schematic view showing the testing message of the allocating document displayed on the screen of the computer device of the signal testing system in FIG. 1.

Please refer to both FIG. 1 and FIG. 5, wherein FIG. 5 is a schematic view showing the testing message of the allocating document displayed on the screen of the computer device of the signal testing system in FIG. 1.

The computer device 12 also includes an allocating document, which can be stored in the storage unit 122. The allocating document includes a testing message M. The signal testing method further comprises the step of deciding a testing item of the handheld device 10 according to the testing message M by using the computer device 12.

For example, as shown in FIG. 5, the screen 123 of the computer device 12 shows the testing items including: automatic test (the item "Auto Test=0" in FIG. 5), second path test (the item "Aux Test=0" in FIG. 5, wherein "0" represents the second path would not be tested, and "1" represents that the DVGA value of the second path would be tested), etc.

In addition, under non-signaling mode (please refer to the item "NON-Signal Config" in FIG. 5), the testing items include master path test (the item "RF Routing Connector=0" in FIG. 5, wherein "0" represents the master path would not be tested and "1" represents the master path would be tested), the tests of all the CDMA frequency bands (the items CELL TX PDM(Cell Band Test)、PCS TX PDM(PCS Band Test) 、AWS TX PDM(AWS Band Test), etc).

Accordingly, it is understood that the testing items may cover the standardized testing items related to CDMA frequency bands to make sure the master path and the second path can satisfy CDMA communication standard to guarantee the communication quality of the handheld device 10.

Of course, in response to the different testing needs, the testing message M included in the allocating document may be changed according to the actual need, and would be not restricted to the items mentioned above. In addition, the setting and result of the above mentioned testing items can be stored in the storage unit 122.

As mentioned, it is noted that the signal testing system of the handheld device in accordance with the embodiment of the present invention and the signal testing method thereof have the following features:

1. With the help of the communication between the computer device, the handheld device, and the testing apparatus, the signal testing process of the handheld device can be operated more automatically to enhance testing efficiency.

2. Because the computer device is communicated with the handheld device and the testing apparatus, after the computer device controls the handheld device accessing the signal testing state, the computer device is capable to receive the power value corresponding to the signal testing state through the testing apparatus.

3. The signal testing system and the signal testing method are capable to test the handheld device supporting multiple frequency bands automatically, both for the emitting power and the receiving power.

4. The automatic test provided by the system and the method of the present invention not only has the advantages of fast testing speed and high successful testing rate, it is also capable to record the related information and manage the tested handheld device by using the serial number.

The detail description of the aforementioned preferred embodiments is for clarifying the feature and the spirit of the present invention. The present invention should not be limited by any of the exemplary embodiments described herein, but should be defined only in accordance with the following claims and their equivalents. Specifically, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A signal testing system of a handheld device, comprising:
a testing apparatus, connected with the handheld device;
a computer device, including an allocating document having a testing message, connected with the handheld device and the testing apparatus, and configured to control a pulse density modulation (PDM) value of the handheld device and the handheld device accessing a signal testing state and receiving a power value corresponding to the signal testing state through the testing apparatus; and
an electric shielding box, configured for allocating the handheld device and a plate antenna;
wherein the computer device is used to decide a testing item of the handheld device according to the testing message, the plate antenna is used to couple and transmit a signal emitted by the handheld device to the testing apparatus and the power value is an emitting value corresponding to the signal.

2. The signal testing system of a handheld device of claim 1, wherein the computer device comprises an USB interface and a communication interface, and the computer device is communicated with the handheld device by using the USB interface and is communicated with the testing apparatus by using the communication interface.

3. The signal testing system of a handheld device of claim 2, wherein the computer device further comprises a testing software.

4. The signal testing system of a handheld device of claim 2, wherein the computer device further comprises a storage unit.

5. The signal testing system of a handheld device of claim 1, further comprises a power supply for providing power to the testing apparatus or the handheld device.

6. The signal testing system of a handheld device of claim 1, wherein the handheld device is electrically connected to a battery.

7. The signal testing system of a handheld device of claim 1, wherein the handheld device is a mobile phone.

8. The signal testing system of a handheld device of claim 7, wherein the mobile phone is a smart phone.

9. A signal testing method of a handheld device, applicable to a signal testing system comprising an electric shielding box, which is configured for allocating the handheld device and a plate antenna, a testing apparatus, which is connected with the handheld device, and a computer device, which is connected with the handheld device and the testing apparatus, the computer device including an allocating document having a testing message, and the signal testing method comprising:

deciding a testing item of the handheld device according to the testing message by using the computer device;

controlling a pulse density modulation (PDM) value of the handheld device and the handheld device accessing a signal testing state by using the computer device;

coupling and transmitting a signal emitted by the handheld device to the testing apparatus by using the plate antenna; and receiving a power value corresponding to the signal testing state through the testing apparatus by using the computer device;

wherein the power value is an emitting power value corresponding to the signal.

10. The signal testing method of a handheld device of claim 9, wherein the computer device comprises a testing software.

11. The signal testing method of a handheld device of claim 9, before the step of controlling the handheld device accessing the signal testing state by using the computer device, further comprising:

transmitting a sequence program through the testing software to read a serial number of the handheld device by using the computer; and deciding whether to control the handheld device accessing the signal testing state or not according to the serial number by using the computer device.

12. The signal testing method of a handheld device of claim 9, wherein the handheld device is a mobile phone or a smart phone.

\* \* \* \* \*